No. 888,906. PATENTED MAY 26, 1908.
J. B. JORDAN.
CUSHION TIRE.
APPLICATION FILED FEB. 25, 1907.
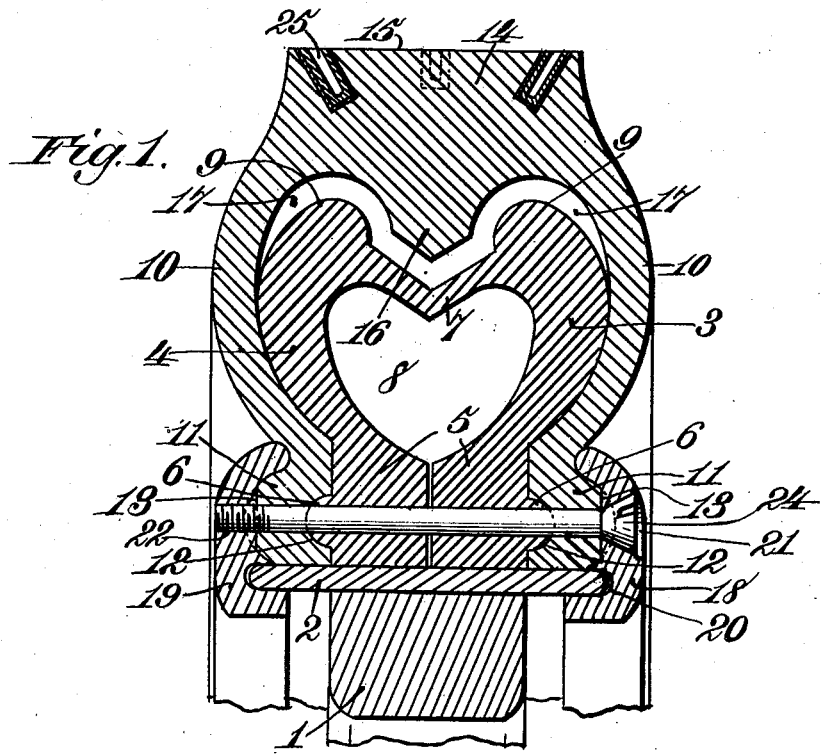
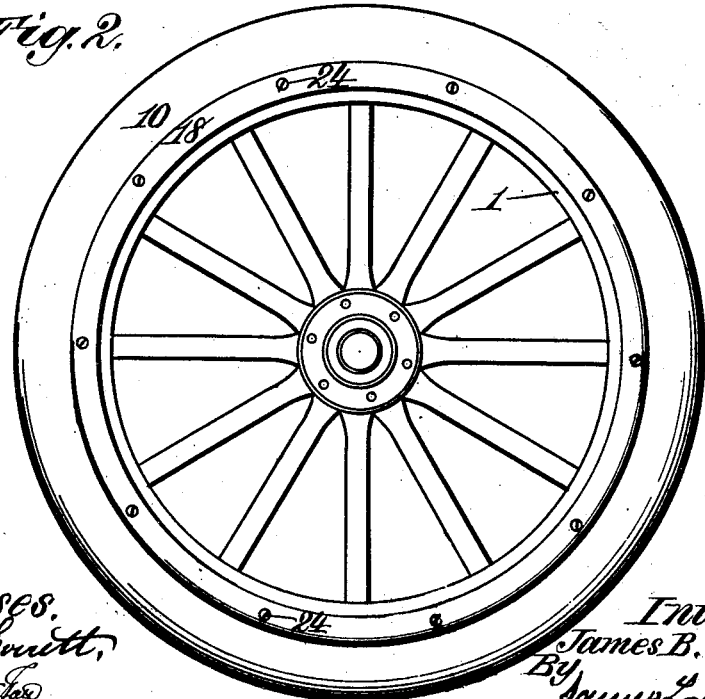
Inventor:
James B. Jordan.

UNITED STATES PATENT OFFICE.

JAMES B. JORDAN, OF NASHVILLE, TENNESSEE.

CUSHION-TIRE.

No. 888,906.  Specification of Letters Patent.  Patented May 26, 1908.

Application filed February 25, 1907. Serial No. 359,181.

*To all whom it may concern:*

Be it known that I, JAMES B. JORDAN, a citizen of the United States, residing at Nashville, in the county of Davidson and State of Tennessee, have invented new and useful Improvements in Cushion-Tires, of which the following is a specification.

This invention relates to cushion tires, and more particularly to that class of cushion tires in which a resilient core is inclosed in an outer casing and the whole suitably fastened to the felly or rim of a wheel; and the object thereof is to provide, in a manner as hereinafter set forth, a tire of such class whereby the resiliency thereof is increased; whereby all danger of creeping through dislocation of the tire is avoided, and further to provide the tire with means to prevent skidding.

Further objects of the invention are to provide a tire of the class referred to which shall be simple in its construction, strong, durable, efficient in its use, conveniently attached to the wheel, offering great resistance to depression and giving a quick return or rebound on pressure being removed or as the tread of the tire leaves the ground, whereby the resilience of the tire is enhanced and its construction strengthened so as to render it suitable either for light or heavy vehicles or road rolling stock, and comparatively inexpensive to manufacture.

With the foregoing and other objects in view, the invention consists in the novel construction, combination and arrangement of parts hereinafter more specifically described and illustrated in the accompanying drawings wherein is shown the preferred embodiment of the invention, but it is to be understood that changes, variations and modifications can be resorted to which come within the scope of the claims hereunto appended.

In describing the invention in detail reference is had to the accompanying drawings wherein like characters denote corresponding parts throughout the several views, and in which—

Figure 1 is a transverse sectional view of a tire in accordance with this invention, showing the same connected to the rim of a wheel, the latter being broken away, and, Fig. 2 is a side view of the wheel with the tire secured thereto.

Referring to the drawings by reference characters, 1 denotes the felly of a wheel to which is attached the rim 2, the latter projecting laterally from each side of the felly 1. The width of the rim 2 is such as to form a proper bearing surface for the resilient core and outer covering constituting the elements of the tire. The rim of enlarged width enables the quick application and removal of resilient tires in case of emergency and in view of such circumstances the width of the rim is preferably greater than that of the felly 1, but it is obvious that the width of the felly can be the same as the width of the rim.

Mounted upon the rim 2 is a resilient core formed of a pair of curved side portions 3, 4 each terminating at one margin in an enlarged marginal portion 5, the outer face of which is formed with a bead 6, while the inner face is smooth. The enlarged marginal portions 5 of the resilient core are adapted to abut against each other when the core is in position in the cover to be hereinafter referred to. The side portions 3, 4 at the top terminate in a V-shaped bridge piece 7, which, in connection with said portions, form a heart shaped chamber 8 thereby forming a hollow core when the latter is set up. The side portions 3, 4 at the top are thickened and extend above the bridge piece 7 so as to provide the protuberances 9.

The hollow core is surrounded by a resilient covering, the sides of which are indicated by the reference character 10 and which terminate in the marginal portions 11. Each of the marginal portions 11 is formed on its inner face with a groove 12 to receive the bead 6 and a portion of the outer face is flattened, as at 13. The marginal portions 11 are adapted to abut against the marginal portions 5 of the core. The side portions 10 of the covering have a portion of the inner face thereof conforming in contour to a portion of the outer face of the side portions of the core, and the said side portions 10 terminate in a thickened portion 14, which forms the tread of the covering, the outer face of said tread being flattened, as at 15, and the inner face formed with an inwardly-extending rib 16 which conforms in contour to the shape of the bridge 7 and at each side of the rib 16 the inner face of the tread portion 14 is of a contour similar to the contour of the protuberances 9. The side portions 10 of the cover are of greater length than the side portions of the core so as to form a space 17 between the core and the tread portion of the cover. The rib 16 may, if preferred, come in contact with the bridge 7, thereby giving greater resistance to heavy loads.

The cover and core are secured to the rim 2 through the medium of a pair of clamping bands 18, 19. These latter are preferably separate from the rim 2, although it is evident that one of the bands may be formed integral with the rim. Each of these bands is formed with grooves, as at 20, to take in the rim 2. The outer portions of the bands are adapted to engage over the marginal portions 11 of the cover. The band 18 is provided with a countersunk opening 21 and the band 19 with a screw-threaded opening. The marginal portions of the core and cover are provided with openings which are arranged in alinement with the openings in the clamping bands. Extending through the opening in the marginal portions of the core and cover and engaging in the screw-threaded opening 22 of the band 19 is a holdfast device 24 provided with a head. The holdfast device 24 is adapted to hold the bands firmly against the outer casing 11, and said device passes through the thickened portions of the inner core 5 and outer casing 11, by this means holding the resilient tire firmly and absolutely in position, insuring against the possibility of throwing the resilient tire out of place or off the wheel by any force or accident.

Anchored in the tread portion 15 of the covering and disposed throughout said tread portion is a plurality of metallic inserts 25, which are preferably in the form of a hollow cone and covered with cloth and also having the outer ends flush with the periphery of the cover. The object in providing the metallic inserts with a covering of cloth is to eliminate the heat ordinarily generated by the metal points of the inserts, such heat producing disintegration of the resilient tire tread. The cloth covering further provides means to prevent the direct contact of the metallic portion of the insert with the road which increases the life of the head of the insert. A further object of the cloth-covered metallic inserts is to prevent the tire from slipping or skidding when traveling over a road-bed and as the inserts are hollow it enables them to carry their own grit, thereby absorbing the heat and further assisting in eliminating the skidding or slipping of the wheel.

When pressure is applied to the tire the rib 16 is forced against the bridge 7 which contracts the same and causes the protuberances 9 to move upward and bear against the inner face of the tread portion 14 and at the same time contract the walls of the chamber 8. The core being in such position will act as a support for the cover and cushion the same.

The peculiar form of the core gives it an exceedingly high degree of resiliency and the finished tire is therefore more resilient than a pneumatic one. By means of the fastening effected by the co-action of the elements 18, 19 and 24 with the rim 2 the tire can be secured in position in such a way that it will be practically impossible for it to be accidentally dislocated. Furthermore, it will be observed that the contraction of the resilient core does not begin until after the cover is depressed and that when the core acts as a cushioning support for the cover the cushioning is had in a gradual manner. Such arrangement reduces shock to a minimum.

The head of the holdfast device 24 is adapted to be positioned in the countersunk portion 21 of the band 18, the head being provided with means to allow it to be removed by a suitable tool.

Although the core is shown as heart-shaped and hollow without any filling, yet it is evident that the opening of the core may be filled with any suitable light material. It is also obvious that a core in the form of a pneumatic tube could be employed in lieu of the heart-shaped core and that the construction of the cover will prevent the puncturing of the pneumatic tube. It is also obvious that the heart-shaped core can surround a pneumatic tube or in other words a pneumatic tube could be positioned in the heart-shaped core and under such circumstances the core would act as a means to prevent puncture of the tube, the cover also preventing the pneumatic tube from being punctured.

What I claim is—

1. A vehicle tire comprising a hollow, heart-shaped resilient core, a cover therefor, combined with means for securing the core and covering to the felly of a wheel, and cloth-covered metallic inserts in the tread of the cover to prevent slipping and skidding of the tire.

2. A vehicle tire comprising a hollow resilient core having enlarged marginal portions, a cover therefor having enlarged marginal portions, the marginal portions of the core extending in the marginal portions of the cover, and means extending through the marginal portions of the core and cover and straddling the rim of the wheel and the marginal portions of the cover for connecting the core and cover to the rim.

3. A vehicle tire comprising a hollow resilient core, a cover therefor, the marginal portions of the core extending into the marginal portions of the cover, combined with means for securing the core and cover to the felly of a wheel, and cloth-covered metallic inserts disposed through the periphery of the cover.

4. A vehicle tire comprising a hollow, resilient core, a cover therefor, said cover having a part of the side portions thereof engaging a part of the side portions of the core, the tread portion of the cover having a rib adapted to engage with the core for contracting the same when pressure is applied to the cover, said core and cover having enlarged end portions, the marginal portions of the core engaging in the marginal portions of the cover, combined with means engaging with the enlarged marginal portions of the cover and extending through the marginal portions of the cover and the marginal portions of the core for attaching the cover and core to the rim of a wheel, and cloth-covered metallic inserts positioned throughout the periphery of the cover.

5. A vehicle tire comprising a resilient core embodying a bridge piece and protuberances projecting away from the bridge piece, a cover for the core, said cover provided on its inner face with a rib and a recess at each side of the rib, said rib adapted to engage the bridge piece for contracting the core thereby causing the protuberances of the core to engage in the recesses of the cover, said cover provided with enlarged marginal portions, said core provided with enlarged marginal portions, the marginal portions of the cover adapted to receive a part of the marginal portions of the core, and means for attaching the cover and core to a wheel.

6. A vehicle tire comprising a resilient core embodying a bridge piece and marginal portions, a cover for the core, said cover provided on its inner face with a rib adapted to engage the bridge piece for contracting the core, thereby causing the upper portion of the core to engage the inner face of the cover, said cover further provided with marginal portions adapted to receive a part of the marginal portions of the core, and means for attaching the cover and core to a wheel, combined with cloth-covered metallic inserts positioned in the periphery of the cover.

7. A vehicle tire comprising a cover having its inner face formed with a rib, a core arranged within the cover and provided with a bridge piece and protuberances, said bridge piece adapted to be engaged by said rib when pressure is applied to the cover, thereby contracting the core and causing said protuberances to abut against the inner face of the cover.

8. A vehicle tire comprising a cover having its inner face formed with a rib, a core arranged within the cover and provided with a bridge piece and protuberances, said bridge piece adapted to be engaged by said rib when pressure is applied to the cover, thereby contracting the core and causing said protuberances to abut against the inner face of the cover, combined with cloth-covered metallic inserts positioned in the tread of the cover, and means for attaching the core and cover to a wheel.

9. A vehicle tire comprising a cover having a flattened tread portion and having its inner face formed with a rib and a recess at each side thereof, a core arranged within the cover and provided with a bridge piece and a protuberance projecting from each side of the bridge piece, said bridge piece adapted to be engaged by said rib when pressure is applied to the cover thereby contracting the core and forcing the protuberances in said recesses.

10. A vehicle tire comprising a cover having a flattened tread portion and having its inner face formed with a rib and a recess at each side thereof, a core arranged within the cover and provided with a bridge piece and a protuberance projecting from each side of the bridge piece, said bridge piece adapted to be engaged by said rib when pressure is applied to the cover thereby contracting the core and forcing the protuberances in said recesses, combined with hollow metallic inserts throughout the periphery of the cover, and means extending through the marginal portions of the cover and core and engaging with the rim of a wheel for connecting said core and cover thereto.

11. A vehicle tire comprising a hollow resilient core, a cover therefor, combined with means for securing the core and cover to the felly of a wheel, and cloth-covered metallic inserts in the tread of the cover to prevent slipping and skidding of the tire.

In testimony whereof I have hereunto set my hand in presence of two subscribing witnesses.

JAMES B. JORDAN.

Witnesses:
  Y. W. HALEY,
  H. A. BLACK.